United States Patent [19]

Brahmbhatt

[11] Patent Number: 4,643,402
[45] Date of Patent: Feb. 17, 1987

[54] SYSTEM FOR PRODUCING A REGULATED ATMOSPHERE FOR A HIGH-TEMPERATURE PROCESS

[75] Inventor: Sudhir R. Brahmbhatt, Macungie, Pa.

[73] Assignee: MG Industries, Valley Forge, Pa.

[21] Appl. No.: 758,330

[22] Filed: Jul. 24, 1985

[51] Int. Cl.⁴ .............................................. C21D 11/00
[52] U.S. Cl. ......................................... 266/82; 266/85; 266/252; 266/254
[58] Field of Search .................................. 266/81–83, 266/85, 249, 255, 254, 257, 252; 148/16, 16.5, 16.6, 16.7, 20.3, 128

[56] References Cited

U.S. PATENT DOCUMENTS 4,279,406  7/1981  Bourhis et al. ........................ 266/81
4,436,289  3/1984  Connelly et al. ...................... 266/80

Primary Examiner—Christopher W. Brody
Attorney, Agent, or Firm—William H. Eilberg

[57] ABSTRACT

The invention provides a method and apparatus for producing a regulated atmosphere in a heat treating furnace. In the preferred embodiment, liquid methanol is heated sufficiently to cause it to dissociate into hydrogen and carbon monoxide, i.e. the combustible components. These dissociated combustible components are then mixed with a relatively inert gas such as nitrogen. This mixture of combustibles and non-combustibles forms the atmosphere for the furnace. The proportion of one or more combustibles in the mixture is measured, and the flow of the inert gas into the mixer is regulated so as to maintain precisely the desired ratio of combustibles to non-combustibles in the furnace atmosphere. The invention includes various mechanisms for preventing unsafe temperature and pressure conditions, and for insuring that unwanted byproducts of dissociated methanol are not created. The system also can be adapted to provide a plurality of atmospheres, having differing contents of combustibles, to several furnaces at once.

9 Claims, 3 Drawing Figures

SYSTEM FOR PRODUCING A REGULATED ATMOSPHERE FOR A HIGH-TEMPERATURE PROCESS

BACKGROUND OF THE INVENTION

The present invention relates to the field of providing suitable atmospheres for heat treating furnaces, or other high-temperature environments, having operating temperatures of the order of about 1500° F., or more.

One example of a heat treating process is shown in U.S. Pat. No. 4,139,375, dealing with sintering of compact powder metal. The atmosphere used in this process prevents oxidation of the parts, among other functions. The furnace atmosphere can also be used to supply carbon to a metal, when the process requires that the level of carbon in the treated metal be precisely maintained.

In the heat treating of metals, it is known to use carrier gases containing hydrogen, carbon monoxide, and nitrogen, and possibly small amounts of other substances such as methane. One method of producing such a gas, in the prior art, has been to inject liquid methanol ($CH_3OH$) into the furnace chamber. The methanol dissociates in the furnace to yield hydrogen and carbon monoxide. However, it is undesirable to inject liquid methanol directly into a furnace. Methanol is very corrosive, and can eat away the metal parts of the furnace, and also the metal belts used to transport workpieces through the furnace. It also corrodes the metal parts of flow measuring equipment located in and around the furnace. Methanol is particularly destructive of aluminum, but it also corrodes other metals, greatly increasing the cost of maintaining the system.

In some systems of the prior art, methanol is vaporized, but not dissociated, outside the furnace. These systems suffer from the problem of condensation of methanol along the transport line. The corrosion problems discussed in reference to the furnace components apply equally to the piping outside the furnace. Also, the combustible content of the furnace atmosphere cannot be precisely controlled in such systems.

Another type of method of generating an atmosphere for a heat treating furnace is shown in U.S. Pat. No. 4,249,965. In the latter patent, nitrogen is mixed with methanol, and the methanol is vaporized, outside the furnace. The vaporized mixture is heated in the presence of a catalyst, also outside the furnace, and the methanol reacts to form hydrogen and carbon monoxide. However, the percentages of nitrogen, hydrogen, and carbon monoxide are fixed by the particular catalytic reaction, and there is no way of varying and controlling the ratio of combustibles to non-combustibles in the furnace atmosphere. Furthermore, while catalysts for dissociation of methanol have the advantage of enabling the dissociation to occur at a low temperature, such catalysts are relatively expensive.

There are many other examples of systems and methods of producing atmospheres for use in heat treating applications. U.S. Pat. No. 4,445,945 discloses a carrier gas of carbon monoxide, hydrogen, and nitrogen, produced from an initial mixture of methanol and nitrogen. U.S. Pat. No. 4,285,742 shows a carrier gas formed from a mixture of nitrogen, water, and methanol injected directly into the heat treating furnace. U.S. Pat. No. 4,450,017 discloses another process wherein the furnace atmosphere includes nitrogen, methanol, and carbon dioxide.

Additional references dealing with atmospheres for heat treating furnaces, for various applications, are U.S. Pat. Nos. 4,049,472, 3,986,900, 4,386,972, 4,372,790, 4,153,485, 4,106,931, 4,069,071, 4,317,687, 4,236,941, 4,175,986, 4,108,693, and 3,891,473.

The present invention discloses a system and method for generating a controlled atmosphere for a high-temperature process. In particular, the invention provides a system for mixing dissociated methanol with nitrogen, outside of the furnace, regulating the relative amounts of combustibles in the mixture, and injecting the mixture into the furnace. The methanol is vaporized and dissociated outside of the furnace, so no liquid ever enters the furnace. The system thereby avoids the corrosion problems due to liquid methanol. The system employs a heater, of conventional design, as a dissociation reactor, and does not depend on the existence of catalysts for the dissociation reaction. The process of the present invention also saves energy, in comparison with methods of the prior art, and provides greater control over the components in the heat treating atmosphere.

The present invention also includes a system wherein regulated atmospheres may be provided to a plurality of furnaces, each atmosphere having a separately regulated proportion of combustible components.

SUMMARY OF THE INVENTION

According to the present invention, liquid methanol is pumped from a source to a start-up heater, through a heat exchanger, and into a main electric heater, or reactor, which causes the methanol to dissociate. The temperature in the reactor is carefully controlled so that no unwanted side reactions occur. The dissociation products, namely hydrogen and carbon monoxide, exiting the reactor, are passed through the heat exchanger, giving up heat to the incoming stream of liquid methanol. The start-up heater is turned off as soon as the reactor has reached its normal operating temperature.

The hydrogen and carbon monoxide are combined with nitrogen gas in a mixer. A hydrogen analyzer, and, if desired, a carbon monoxide analyzer, are placed in the output line. If the proportion of combustibles, i.e. hydrogen or carbon monoxide, in the mixture is too high or too low, the system adjusts a valve in the nitrogen line, increasing or decreasing the amount of nitrogen in the final product gas. The system thereby provides a precisely controlled atmosphere for a heat treating furnace. All of the dissociation of the methanol occurs outside the furnace, and no liquid is allowed to enter the furnace. The dissociation takes place in a standard heater, which can be constructed according to many conventional designs.

In another embodiment, the invention can be used to provide atmospheres, having differing proportions of combustibles, to a plurality of heat treating furnaces simultaneously. This embodiment includes an apparatus of the type described above, the apparatus being set to provide an atmosphere having a proportion of combustibles which is at least as great as the maximum level of combustibles required in the several furnaces. The gas flowing in the output line is diverted into a plurality of separate, parallel conduits, and nitrogen is mixed into each conduit separately, as needed, to reduce the proportion of combustibles from the maximal level. Thus, a single methanol dissociating apparatus provides different atmospheres to individual furnaces.

It is therefore an object of the present invention to provide a system for producing a regulated atmosphere for use in a high-temperature process.

It is another object of the invention to provide a system for generating an atmosphere for use in a heat treating furnace.

It is another object of the invention to provide a system as described above, wherein the proportion of combustibles in the generated atmosphere can be precisely regulated.

It is another object of the invention to provide a system as described above, wherein the dissociation into combustible components is accomplished outside the furnace.

It is another object to provide a system as described above, wherein the system minimizes the problems of corrosion associated with the handling of liquid methanol.

It is another object of the invention to provide a system as described above, wherein the system has automatic means for protecting the components of the system from unsafe temperatures and pressures.

It is another object of the invention to provide a system as described above, wherein the reactor used for dissociation of methanol can be virtually any type of heater.

It is another object of the invention to provide an energy-conserving process for producing a regulated atmosphere for a heat treating furnace.

It is another object of the invention to provide a process for generating a regulated atmosphere for a heat treating furnace, wherein liquid is prevented from entering the furnace, and wherein the problems of unwanted chemical reactions with pipes and other components are substantially reduced.

It is another object to provide a method and apparatus for simultaneously supplying a plurality of atmospheres, having differing combustible contents, to a plurality of heat treating furnaces.

Other objects and advantages of the invention will be apparent to those skilled in the art, from a reading of the following brief description of the drawings, the detailed description of the invention, and the appended claims.

DETAILED DESCRIPTION OF THE INVENTION

The present invention includes a method and apparatus for producing a regulated atmosphere for use in a heat treating furnace, or other high-temperature environment. Specifically, the invention provides a means of generating an atmosphere wherein the ratio of combustibles to non-combustibles can be precisely controlled.

As used herein, the term "combustibles" means the hydrogen and carbon monoxide which are the dissociation products of methanol, the liquid used to produce the atmosphere. The term "non-combustibles" refers to nitrogen, which is virtually inert at temperatures below about 2000° F.

While the invention will be described with reference to methanol and nitrogen, it is understood that the invention is not limited to use with these substances. Other organic compounds could be used to provide combustible components for the atmosphere, and other inert, or nearly inert gases could provide the non-combustible component. Moreover, while the following description deals with a heat treating furnace, it is understood that the method and apparatus of the invention can be used in any application requiring an atmosphere wherein the ratio of combustibles to non-combustibles is precisely regulated.

Figure 1:
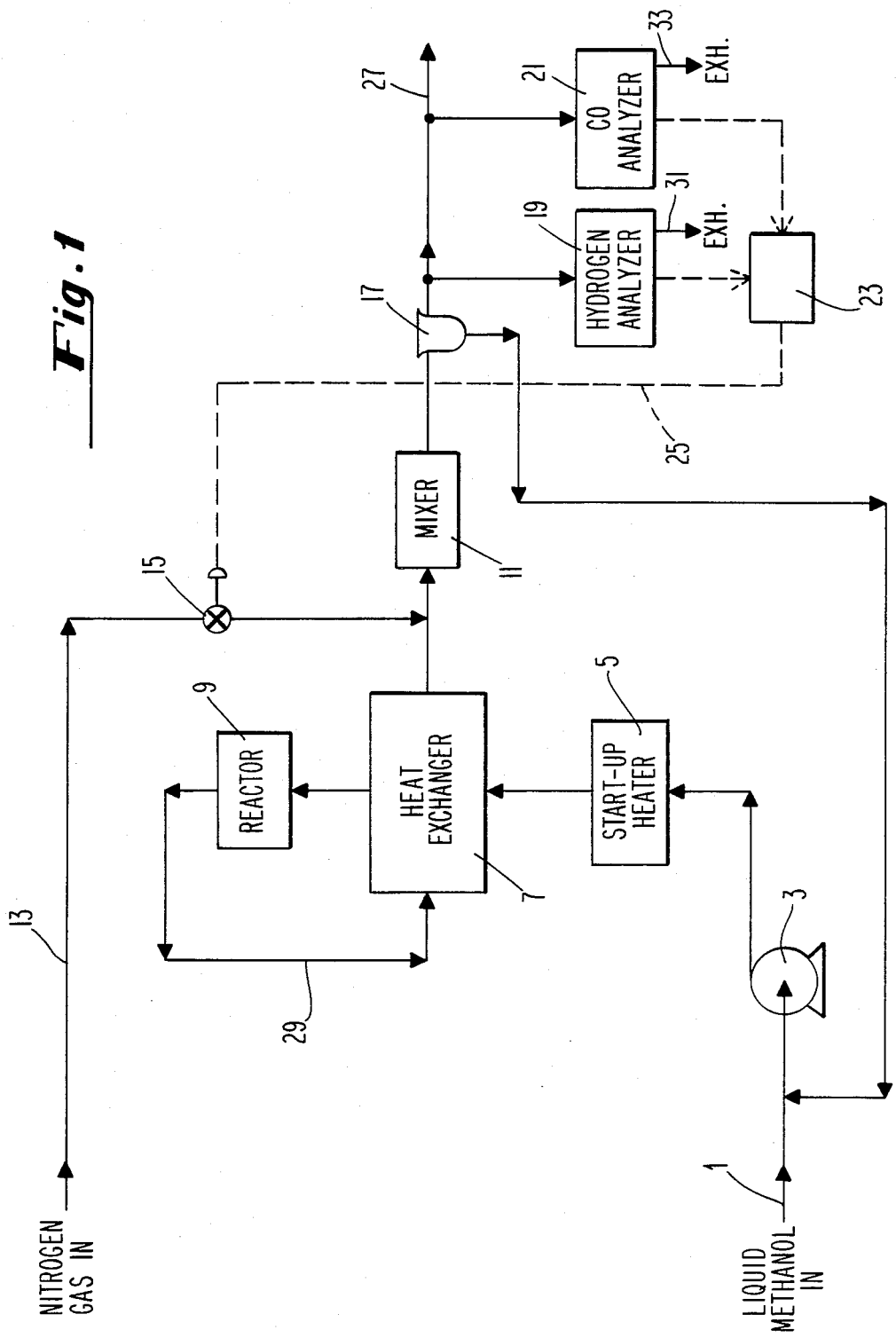
FIG. 1 is a schematic diagram illustrating the general concept and operation of the present invention.

FIG. 1 is a schematic diagram showing the general operation of the invention. Liquid methanol flows through conduit 1, and is pumped through the system by pump 3. Start-up heater 5 is an electrical heater which vaporizes the methanol, but does not cause dissociation. It is important that dissociation of the methanol not occur too soon in the system. Otherwise, unwanted "side" reactions will occur, and undesirable compounds and/or elements will be deposited. In particular, premature dissociation of methanol will result in soot formation throughout the system. The temperature of the methanol leaving the start-up heater 5 is of the order of 400° F.

The vaporized methanol passes through heat exchanger 7 and into reactor 9. Heat exchanger 7 can be any conventional heat exchanger. Reactor 9 is, in the preferred embodiment, an electric heater, designed to operate at temperatures of the order of 1500° F., which is sufficient to cause dissociation of the methanol. The dissociated methanol, i.e. a gas containing hydrogen and carbon monoxide, is passed through conduit 29 and through heat exchanger 7. The dissociated methanol therefore gives up heat to the incoming stream of methanol.

Start-up heater 5 is used only when the system is first turned on. After the reactor 9 has reached its normal operating temperature, the initial vaporization of the incoming liquid methanol is performed in heat exchanger 7, the heat being obtained from the output of reactor 9. Start-up heater 5 is then turned off. The heat exchanger not only saves energy, by reusing the heat produced by the reactor, but also insures that the output gas, having given up some of its heat to the incoming stream, will be relatively cool. Thus, there is no need for an expensive piping system for handling ultra-hot gases in the output stream.

Nitrogen gas passes through conduit 13, and through valve 15, and is mixed with the dissociated methanol in mixer 11. Liquid trap 17 removes residual liquid from the line and returns the liquid to conduit 1.

The system is provided with at least one analyzer for determining the proportion of a particular component in the output stream. FIG. 1 shows two such analyzers, namely hydrogen analyzer 19 and carbon monoxide analyzer 21. It is understood that the system could be used with only one of these analyzers. The analyzers can be of any conventional design.

Hydrogen analyzer 19, which is provided with exhaust port 31, is connected to controller 23, which controls valve 15, as indicated by control line 25. Carbon monoxide analyzer 21 also has an exhaust port 33, and is also connected to controller 23. Analyzer 21 could also be connected to a separate controller similar to controller 23. When the proportion of hydrogen in the output stream is determined by the analyzer to exceed a predetermined value, controller 23 causes valve 15 to allow more nitrogen into the mixture. A similar operation occurs when the proportion of hydrogen is too low. Valve 15 is a proportional valve, allowing a continuously variable flow of gas therethrough. The operation of analyzer 21 is exactly the same.

Either analyzer 19 or 21 could be eliminated, as mentioned above, because one can calculate the amount of carbon monoxide in the output stream from knowledge of the amount of hydrogen, using the basic equation describing the dissociation of methanol:

$$CH_3OH \rightarrow 2H_2 + CO$$

Nevertheless, use of two analyzers increases the certainty and reliability of the result.

Figure 2:
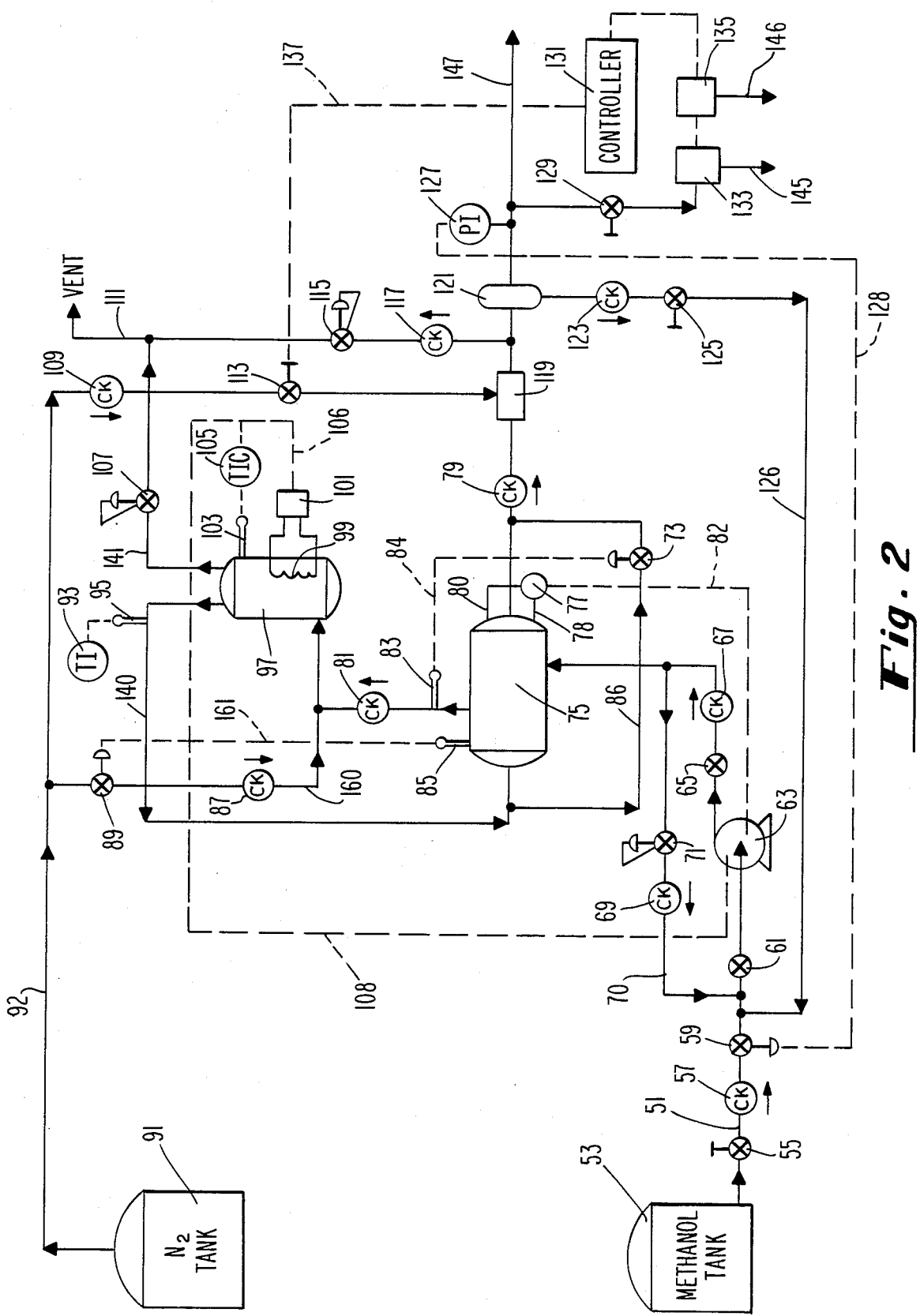
FIG. 2 is a more detailed schematic diagram, illustrating one way of implementing the concept shown in FIG. 1.

A more detailed embodiment of the invention is illustrated schematically in FIG. 2. For clarity of illustration, the start-up heater, shown in FIG. 1, has been omitted in FIG. 2. It is understood that a start-up heater would be placed between the pump and the heat exchanger, as shown in FIG. 1.

Methanol from tank 53 flows through conduit 51. Manually operated valve 55 allows the system to be shut down when necessary. Check valve 57 prevents liquid from flowing back to the tank. The liquid is conveyed by pump 63, which has block valves 61 and 65, on either side of the pump, to enable the pump to be easily removed from servicing. The methanol flows through check valve 67, through the start-up heater (not shown), and into heat exchanger 75.

Conduit 70 has back pressure regulating valve 71 and check valve 69, which together protect the pump 63 in case of blockage in the line. If the line is blocked, and the liquid pressure exceeds the set point of valve 71, liquid can flow through conduit 70, thereby relieving stress on the pump.

Heat exchanger 75 is equipped with a switching means 77 and sensors 78 and 80, to detect the level of liquid methanol in the exchanger. When the liquid level in the exchanger is too high, as sensed by sensor 80, the switching means 77 signals pump 63, through control line 82, causing the pump to slow down or stop. Similarly, if the liquid level is sensed by sensor 78 to be too low, switching means 77 causes the pump to turn on or increase speed. The means of control represented by control line 82, or by any of the control lines illustrated in the drawings, can be any conventional means, such as electric, hydraulic, pneumatic, or mechanical, or even manual. If the means of control is manual, such control could be accomplished by periodically opening and closing valve 55. If the means of control is automatic, it would be necessary to employ a pump having a continuously or discretely variable speed control. It is understood that control line 82 represents all of these possible arrangements.

Flow indicators can be placed at various locations to inform an operator about the conditions in the system. A good location for such a flow indicator would be in the liquid methanol line, immediately before the methanol enters the heat exchanger and before it enters the start-up heater (not shown in FIG. 2). The methanol is still liquid, and relatively cool, at this point, and its flow rate can therefore be very easily measured here. Flow indicators can be placed at additional positions in the system, as desired.

It is important that the liquid level in heat exchanger 75 not become too high or too low. If the level is too high, liquid may enter reactor 97, resulting in undesirable side reactions and hot spots, and the formation of soot in the reactor vessel. If the level is too low, the methanol vaporizing in the heat exchanger may start to dissociate prematurely, i.e. before reaching the reactor 97, causing other, unwanted side reactions. It is important that the dissociation be performed only in the reactor 97, and it is therefore necessary that the vaporized methanol undergo a sharp temperature increase when it leaves the heat exchanger and enters the reactor. Also, a low liquid level in the heat exchanger will create a product gas that is too hot, and which is more likely to corrode pipes and instruments in the flow path.

Vaporized methanol flows out of heat exchanger 75, through check valve 81, and into reactor 97. Reactor 97 can be an electric heater, or other kind of heater. Indeed, one advantage of the invention is that a wide variety of heaters can be used for reactor 97, the only requirement being that the heater be capable of creating the necessary temperature and operating at the desired pressure of about 30 psia. Moreover, there is no need, in the present invention, to rely on expensive and specialized catalytic heaters to accomplish the dissociation of the methanol. While the dissociation step requires a large amount of heat, this heat is then recovered and reused, in the heat exchanger, to vaporize the incoming liquid.

The source of heat for the reactor is shown as coil 99, having power supply 101, but, as indicated above, other means of providing heat could be used. Temperature sensor 103 measures the temperature in reactor 97, and the temperature sensed is the input to temperature indicator and controller 105. Controller 105 controls the operation of the reactor through control line 106, and also controls pump 63, as indicated by control line 108. Thus, if the temperature in reactor 97 is too high, controller 105 causes power to the heating coil 99 to be reduced or turned off and also causes the pump to force more methanol into the system. If the temperature in reactor 97 is too low, the reverse operations occur.

It is important that the temperature in reactor 97 be kept at a steady level. As shown in FIG. 1 of the paper by G. E. Voecks et al, entitled "Operation of a Catalytic Methanol Decomposition Reactor for Vehicular Use", published in the Proceedings of the Alcohol Fuels Technology 4th International Symposium, 1980, Section B9, page 275, (the disclosure of which is incorporated by reference herein), the ideal temperature for methanol dissociation is about 1472° F. If the temperature falls even by a small amount from this temperature, relatively large quantities of unwanted components, such as carbon, methane, carbon dioxide, and water, are formed. On the other hand, if the temperature in the reactor becomes too high, the reactor pressure may reach a dangerous level, and the output gas may become too hot.

Dissociated methanol leaves reactor 97 through conduit 140. Another conduit 141, provides pressure relief, in the event that excessive temperature in the reactor has caused a high internal pressure. Pressure regulating valve 107 provides a path to vent line 111, if the pressure in the reactor exceeds a predetermined level. The pressure in the reactor is normally about 30 psia, but the pressure could become higher if there were side reactions occurring in the reactor, or if temperature control over the heat source for the reactor were lost.

The dissociated methanol flowing through conduit 140 normally passes through heat exchanger 75. However, if the vaporized methanol leaving the exchanger is too hot, as sensed by temperature sensor 83, valve 73 is opened, by control line 84, allowing the dissociated methanol to bypass the heat exchanger by traveling through conduit 86.

Dissociated methanol, i.e. hydrogen and carbon monoxide, flows through check valve 79, and into mixer 119. Mixer 119 combines the dissociated methanol with nitrogen from tank 91, which has been delivered through conduit 92, check valve 109, and valve 113. If the pressure of the output gas stream exceeds a predetermined level, as fixed by pressure regulating valve 115, the gas is vented through check valve 117 and through vent 111.

Conduit 160 is also provided for carrying nitrogen gas into reactor 97 when the system is first started. Valve 89, which is normally closed, is controlled, as indicated by control line 161, by temperature sensor 85 on heat exchanger 75. When the system first placed in operation, and the reactor 97 is therefore empty, the sensed temperature will be low, and valve 89 will be opened. Thus, as the coil in reactor 97 develops heat, nitrogen flows through check valve 87, and into the empty reactor to absorb this heat. Without this provision, the empty reactor vessel could be damaged by the excessive and undissipated heat.

Just as it is necessary to inject nitrogen into the reactor before the reactor can be brought to its operating temperature, it is similarly necessary to fill the furnace itself (not shown in the figure) with nitrogen before the furnace is heated. Heating an empty furnace would cause the same kind of damage that would be caused by heating an empty reactor. The system shown enables nitrogen from the same source, i.e. tank 91, to serve both functions, namely providing initial atmospheres to both the furnace and the reactor. Since the conduits shown provide an unobstructed path from the nitrogen tank to the furnace, there is no extra expense incurred because of this dual use of the nitrogen during the start-up phase.

When the system is first placed in operation, nitrogen is heated in the reactor before any liquid methanol has been allowed to enter the heat exchanger 75. Nitrogen that is so heated thus passes out of the reactor, through the empty heat exchanger, and enters the furnace. This heated nitrogen can be mixed with the nitrogen that has already been injected into the furnace, and if so mixed, will increase the temperature of that nitrogen. The heat generated by the reactor, before normal operation is begun, can thus be partly recovered and reused. Also, the nitrogen supplied to the furnace during the start-up phase, whether it comes directly from the nitrogen tank or from the reactor, serves the purpose of purging unwanted gases from the furnace, before the start of regular operation.

Liquid trap 121 collects droplets of condensed liquid methanol, and this liquid flows through check valve 123, hand operated valve 125, and conduit 126 for recirculation by pump 63.

Pressure indicator and controller 127 is provided in the output line, and operates valve 59, as indicated by control line 128. If the output pressure is too low, it can be increased by opening valve 59, and vice versa.

Gas analyzers 133 and 135, having exhaust means 145 and 146, are connected to sample the output gas, through 129. The analyzers operate valve controller 131, which opens or closes valve 113, through control line 137, when it is necessary to decrease or increase the amount of combustibles in the output gas. The output gas flows through conduit 147, and into a furnace or other use point (not shown).

The measurement of the amount of combustibles in the output stream can be done repeatedly, at fixed intervals, and the flow of nitrogen can be adjusted accordingly. The measurement can also be performed continuously, and the setting of valve 113 can also be continuously adjusted in response to this measurement.

It is seen that heat exchanger 7 of FIG. 1 corresponds to heat exchanger 75 of FIG. 2. Similar correspondences exist between elements 9 and 97, 11 and 119, 3 and 63, 19 and 133, etc.

The invention can be modified to supply gas to a plurality of furnaces, each having an atmosphere with a different ratio of combustibles to non-combustibles. This embodiment is illustrated schematically in FIG. 3.

Figure 3:
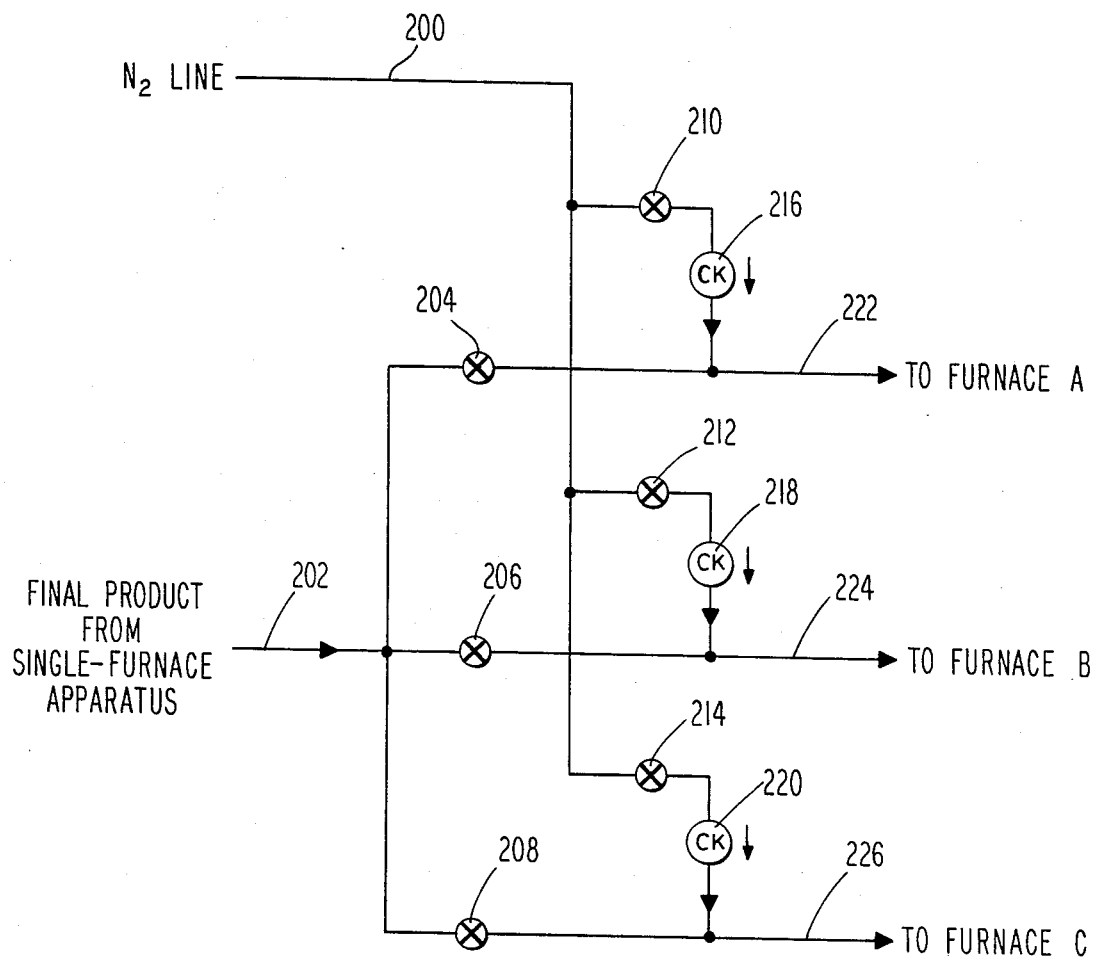
FIG. 3 is a schematic diagram of another embodiment of the invention, wherein separate atmospheres can be provided to a plurality of furnaces.

In the embodiment of FIG. 3, a system of the kind described with reference to FIGS. 1 or 2 is set to produce an atmosphere having the maximum combustible content that would be required in any one furnace. The actual dissociation apparatus is not illustrated in FIG. 3. The output of the dissociation apparatus appears at conduit 202 in FIG. 3.

The gas is then divided into several parallel sub-streams, flowing through conduits 222, 224, and 226, which have valves 204, 206, and 208 respectively. The combustible level of each sub-stream is then reduced by adding calculated amounts of nitrogen, separately (and in parallel) for each sub-stream. The nitrogen is obtained from conduit 200, which is tapped to direct nitrogen into each sub-stream, the nitrogen flowing through valves 210, 212, and 214, and also check valves 216, 218, and 220. One or more gas analyzers (not shown in FIG. 3) are provided to regulate the flow of nitrogen into each conduit, in the same manner described with reference to the other figures. The separate atmospheres can then be directed into the respective furnaces, labeled as A, B, and C, but not shown in FIG. 3.

In this modification, all the dissociation is still done outside the furnace, in one central apparatus, and, as before, no liquid is allowed to enter the furnace. The combustible level of the atmosphere of each furnace is therefore separately and simultaneously controlled.

The present invention saves energy in comparison to prior art systems wherein methanol is dissociated in the furnace. The dissociation products of methanol have a greater heat of combustion per mole than a mole of methanol. This face can lead to a fuel cost savings of the order of 25%. The system also saves energy due to the re-use of the heat generated to accomplish the methanol dissociation. As described above, after the system has been in normal operation, there is no further need for a separate start-up heater, as the incoming methanol is vaporized by the hot gas leaving the reactor.

The objects of the invention are clearly fulfilled by the above disclosure. It is understood that the above-described embodiments are only illustrative, and that the invention can be varied in many ways. For example, the particular means of control of valves and pumps can be changed. The substances used to produce the output gas can be changed. Different types of heaters, i.e. non-electric, could be used, and different configurations for other components, such as the heat exchanger, can be employed. These and other modifications are to be deemed within the spirit and scope of the following claims.

What is claimed is:

1. A system for providing a regulated atmosphere for a high temperature furnace, the system comprising:
   (a) startup heater means, connected to a source of a first fluid, for vaporizing the first fluid when the apparatus is initially activated,
   (b) heat exchange means, connected to receive the vaporized first fluid from the startup heater means,
   (c) a dissociation heater, the dissociation heater being located outside of the furnace, and being connected to receive fluid from the heat exchange means, the dissociation heater being the sole means of dissociation of the fluid into a plurality of combustible components, the output of the dissociation heater being connected to convey dissociated fluid into the heat exchange means, whereby incoming fluid entering the heat exchange means can be vaporized by the heat provided from the output of the dissociation heater,
   (d) means for mixing the dissociated first fluid with a diluting fluid, said diluting fluid being substantially inert at the temperatures present in the furnace,
   (e) means for measuring the proportion of one or more of the combustible components, in the mixture of fluids, and
   (f) means for regulating the flow of the diluting fluid into the mixing means, in response to the measured proportion of combustibles.

2. The system of claim 1, further comprising means for regulating the level of liquid in the heat exchange means.

3. The system of claim 2, further comprising pump means for forcing liquid through the system, wherein the level regulating means is operatively connected to the pump means.

4. The system of claim 3, further comprising means for regulating the temperature in the dissociation heater.

5. The system of claim 4, wherein the temperature regulating means is operatively connected to a heat source means disposed in the dissociation heater, and also to the pump means.

6. The system of claim 5, further comprising means for bypassing the output of the dissociation heater around the heat exchange means, when the temperature in the heat exchange means is above a predetermined level.

7. A system for providing a regulated atmosphere for a high temperature furnace, the system comprising:
   (a) a heater for dissociating a first fluid into a plurality of combustible components, the heater being the sole means of dissociation of the fluid, the heater being located outside of the furnace,
   (b) means for mixing said first fluid with a diluting fluid, said diluting fluid being substantially inert at the temperatures present in the furnace,
   (c) means for measuring the proportion of one or more of the combustible components, in the mixture of fluids, and
   (d) means for regulating the flow of the diluting fluid into the mixing means, in response to the measured proportion of combustibles.

8. A system for providing a regulated atmosphere for a heat treating furnace, the system comprising:
   (a) a reactor means, the reactor means comprising a heater which is capable of dissociating an incoming fluid into a plurality of combustible components, wherein the heater is the sole means of dissociating the fluid, the heater being located outside of the furnace,
   (b) heat exchange means, connected to the incoming fluid and to the output of the reactor means, wherein the heat exchange means provides heat transfer from the output of the reactor means to the incoming fluid stream,
   (c) means for mixing the dissociated combustible components exiting the reactor means with a relatively inert diluting fluid,
   (d) means for monitoring the amount of at least one combustible component in the output of the mixing means, and
   (e) means for controlling the flow of the diluting fluid in response to the measured proportion of said combustible component in the output of the mixing means.

9. A system for providing regulated atmospheres for a plurality of heat treating furnaces, the system comprising:
   (a) heater means for dissociating a first fluid into a plurality of combustible components, the heater means being the sole means of dissociating the fluid, the heater being located outside of any of the furnaces,
   (b) means for dividing the first fluid into a plurality of substreams,
   (c) means for measuring the proportion of one or more of the combustible components, in each of said substreams, and
   (d) means for injecting separately variable amounts of a relatively inert diluting gas into each of the substreams, wherein each substream contains the proportion of combustibles required for a particular furnace.

* * * * *